United States Patent [19]

Zulian

[11] Patent Number: 5,321,433
[45] Date of Patent: Jun. 14, 1994

[54] ELECTROPHOTOGRAPHIC PRINTING APPARATUS WITH ENHANCED PRINTED IMAGE CAPABILITY

[75] Inventor: Ferruccio Zulian, Cornaredo, Italy

[73] Assignee: Bull HN Information Systems Italia S.p.A., Caluso, Italy

[21] Appl. No.: 971,801

[22] Filed: Nov. 5, 1992

[30] Foreign Application Priority Data

Nov. 12, 1991 [EP] European Pat. Off. ........ 91830488.2

[51] Int. Cl.$^5$ .............................................. H04N 1/21
[52] U.S. Cl. .............................................. 346/108
[58] Field of Search .............. 346/108, 76 C, 1.1, 346/107 R, 160; 358/296, 300, 302, 298

[56] References Cited

U.S. PATENT DOCUMENTS

| | | | |
|---|---|---|---|
| 1,684,800 | 9/1928 | Maximoff et al. | 373/33 |
| 2,022,112 | 11/1935 | Ferguson | 373/27 |
| 2,485,851 | 10/1949 | Stevens | 373/146 |
| 2,747,006 | 5/1956 | Barnand | 65/2 |
| 3,244,495 | 4/1966 | Apple et al. | 373/27 |
| 3,244,511 | 4/1966 | Nicaise | 65/1 |
| 3,531,574 | 9/1970 | Sterling et al. | 373/138 |
| 3,876,817 | 4/1975 | Bussy | 373/27 |
| 3,912,477 | 10/1975 | Brady et al. | 65/1 |
| 4,146,373 | 3/1979 | Sullivan et al. | 65/1 |
| 4,310,757 | 1/1982 | Check, Jr. et al. | 250/236 |
| 4,847,641 | 7/1989 | Tung | 364/154 |
| 4,873,698 | 10/1989 | Boen | 373/156 |
| 5,029,108 | 7/1991 | Lung | 364/519 |
| 5,046,110 | 9/1991 | Carucci et al. | |
| 5,109,389 | 4/1992 | Stenzel | 373/156 |

OTHER PUBLICATIONS

EP Search Report on counterpart to subject case citing foregoing-Jul. 2, 1992.

Primary Examiner—Mark J. Reinhart
Attorney, Agent, or Firm—J. S. Solakian; J. H. Phillips

[57] ABSTRACT

Electrophotographic printing apparatus with enhanced printed image capability in which the image is formed by dots located at image pixels having a predetermined size, comprising a scanning light beam source and circuits for modulating the light beam so as to form dots having a size in the direction transverse the scan direction equal, smaller or greater than the pixel size.

3 Claims, 3 Drawing Sheets

ELECTROPHOTOGRAPHIC PRINTING APPARATUS WITH ENHANCED PRINTED IMAGE CAPABILITY

FIELD OF THE INVENTION

The present invention relates to an electrophotographic printing apparatus with enhanced printed image capability.

BACKGROUND OF THE INVENTION

Typically, non-impact printing machines are designed to create a printed image by printing a series of picture elements, pixels or dots, on a print medium such as paper. In electrophotographic printing apparatus, the process of image generation is the same, although indirect, in the sense that the image is first formed on a photosensentive member, as a latent image, and then transferred to a paper sheet through a developing process. The image on then photosensitive member is formed by a light beam (usually a laser beam) which scans the electrically charged surface of the photosensitive material in a succession of scan lines. Each scan line is divided into pixel areas, and the light beam is modulated (e.g., switched on or off) at each pixel location, so as to selectively discharge the photosensitive material at the location of selected pixels. In this manner, an image is formed on the photosensitive member, the image consisting of pixels which have retained an electrical charge and pixels which have been discharged.

Thereafter, toner is applied to the surface of photosensitive material and adheres thereto in the locations (pixels) which have been discharged (in the case of positive or write-black process), or in the locations which have not been discharged (negative or write-white process). This step is known as the developing step and is followed in known manner by a transfer step (the toner is transferred to paper) and by a fixing step (the toner is fused onto the paper). The printed image produced by an electrophotographic printing apparatus its therefore a digitized image, or a bit mapped image, of a desired analog image which is represented and described at best by a discrete set of pixels or dots.

The resolution of the bit mapped images formed by electrophotographic printing machines is typically 300 dots per inch. No higher resolution is generally adopted because it would result in expensive and slow apparatus. With a resolution of 300 dots per inch, the discontinuities of the printed image as to a desired continuous image which has been digitized are readily perceivable, in particular when nearly vertical lines or edges or nearly horizontal lines or edges have to be printed. These lines or edges are effectively printed as stair steps showing undesired jaggies. Proposals have been made to overcome this limitation and to provide edge smoothing, without increasing the bit mapped image resolution, by using three basic approaches and combinations thereof:

1) Adding or substituting gray pixels for the normal black or white pixels at the edges of images;

2) Adding or substituting reduced size dots in pixels at the edges of images;

3) Adjusting the placement of dots as to the pixels in the scan direction.

In particular, U.S. Pat. No. 4,847,641 provides a summary of documents suggesting several approaches, and discloses a method and apparatus which uses a combination of approaches 2) and 3) above. All these approaches provide a partial solution to the problem of enhancing the quality of the image, but are not entirely satisfactory, particularly when lines or edges slightly slanted as to the scan direction of the light beam have to be printed.

OBJECTS OF THE INVENTION

It is therefore an object of the present invention to overcome this limitation and to provide a further improvement over the enhancement techniques so far known.

In another aspect, it is an object of the present invention to provide a substantial elimination of jaggies.

SUMMARY OF THE INVENTION

Basically, this result is achieved by providing apparatus for enhancing the printed image which is capable of substituting both reduced and enlarged dots in pixels at the edges of images, the enlarged dots having a size enlarged at least in the direction transverse the scan direction of the equipment. This approach proves to be much more effective than that of adding or substituting reduced size dots at the edges of the images, especially when combined with the other approaches. Further, it benefits from the fact that the thinnest printable lines usually comprises two adjacent lines of dots.

According to the invention, substitution of enlarged dots is obtained by providing printing means, basically a light source which, in response to a bit signal pulse representative of a pixel to be printed, forms a dot having a width, in the direction transverse the scan direction, twice the width of the standard pixel (hence, the pitch between subsequent scans). In order to obtain a standard size dot having a width substantially equal to the width of a pixel (in the direction transverse the scan direction), the light beam is modulated either by controlling the intensity of the light beam or, preferably, by switching on and off the light beam according to a modulation pattern which reduces the energization duty cycle of the light source and hence the exposure of the photosensitive member pixel. Thus, in order to obtain an enlarged dot, it suffices to energize the light source at a higher intensity level or with an on/off modulation which increases the duty cycle. Conversely, in order to obtain a reduced dot size, the source is energized at a lower intensity level or with an on/off modulation which decreases the duty cycle.

DESCRIPTION OF THE DRAWING

The features and the advantages of the invention will appear more clearly from the following description of a preferred form of embodiment and the enclosed drawings where.

DESCRIPTION OF THE PREFERRED EMBODIMENT(S)

Figure 1:
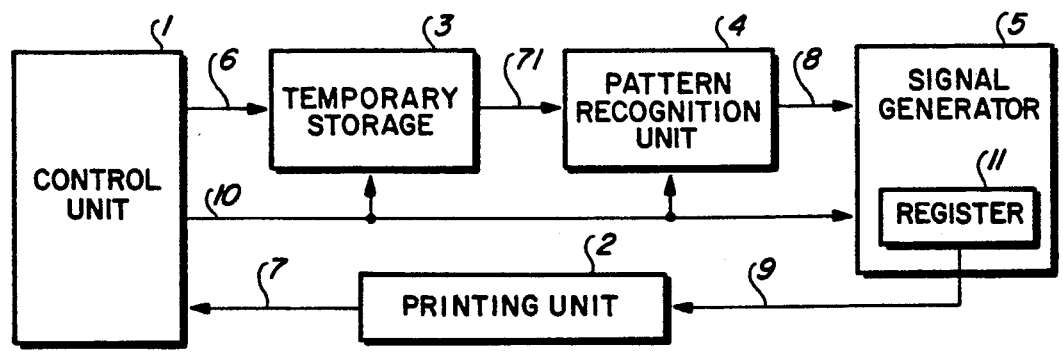
FIG. 1 shows in block diagram the architecture of an electrophotographic printing apparatus with enhanced printed image capability in accordance with the invention.

FIG. 1 shows in schematic diagram an electrophotographic printing apparatus with enhanced printed image capability in accordance with the invention. Basically, the electrophotographic printing apparatus of the invention comprises a control unit 1, a printing unit or engine 2, a temporary storage 3, a pattern recognition unit 4 and a signal generator 5. Since the above components differ in limited aspects from components already known in the prior art, a brief description of these components is provided, limited to the detailed description to the characterizing features.

A detailed description of possible embodiments of the above components may be found in U.S. Pat. No. 4,847,641, already cited. The control unit 1 is an electronic apparatus which, based on instruction received from an operator or a computer, stores a text to be printed or an image to be printed in the form of a bit map which is serialized and output on a lead 6 as a bit stream or bit data signal. In the case of alphanumeric text, the control unit 1 operates as a character generator in the sense that a binary code (for instance an ASCII code) representative of a character is converted into a bit mapped image representative of the desired shape of the character.

The control unit 1 further provides, through a communication channel 7, control and timing signals to the engine 2 and receives status signals therefrom. The engine 2 comprises known printing means including paper feeding means, a controlled light beam source (generally a laser) scanning a photoconductive surface, a corotron for electrically charging the photoconductive surface, a developer for transferring toner to the photosensitive surface, a transfer station unit for transferring toner from the photosensitive surface to the paper, a fusing station unit for fixing the toner to the paper, the several elements being controlled and timely coordinated by the control unit 1.

In conventional electrophotographic printers, the bit data signal in output from control unit 1 is used without modification, except for amplification, if required, and impedance matching, for controlling the light beam source which is switched on/off in accordance with the received bit stream, each bit being related to a pixel of the image. In electrophotographic printers provided with enhancing apparatus as shown in FIG. 1, the bit data signal on lead 6 is input to a temporary storage 3 which stores portions of the bit data signal representing N numbers of consecutive bits in M number of consecutive lines of the bit mapped image. In other words, a portion of the bit mapped image describing M×N pixels of the image is stored in the temporary storage 3. The temporary storage 3 acts as a FiIFO buffer from which a bit pattern can be read out in parallel representing the binary level of a central bit of the bit mapped image portion stored in temporary storage 3 and of predetermined bits surrounding the central bit. The bit pattern read out from temporary storage 3 is input to the pattern recognition unit 4 through leads 71. The pattern recognition unit 4 may be implemented in several ways. U.S. Pat. No. 4,847,641 discloses an embodiment where the pattern recognition unit stores a plurality of comparison bit patterns, or templates, each related to a particular shape of the image to be printed.

The pattern recognition unit 4 comprises comparison circuits for comparing the bit pattern received from temporary storage 3 with the plurality of templates stored therein and outputs a matching code or correction code, related to the matching template, on leads 8. The correction code indicates if the central bit (cell under test) stored in temporary storage 3 and currently investigated as to its relation with the surrounding bits is to be printed as an unmodified pixel of standard size, or has to be subjected to some modification which offsets it in the scan direction or reduces its size.

According to the present invention, the pattern recognition unit performs a similar function and may be similar in structure, but provides in output a correction code which may have one of three distinct meanings. The correction code may indicate that the cell under test has to be printed as an unmodified pixel of standard size and therefore that the light beam source will have to be controlled or modulated so as to provide such standard size, where the dot diameter is substantially equal to the resolution of the bit mapped image and to the scan pitch. The correction code may also indicate that the cell under test has to be printed as an enlarged dot (compared to the standard size dot) having an amplitude, in the direction transverse the scanning direction, of one of a plurality of predetermined amplitudes comprised between the scan pitch and two times the scan pitch. The correction code may further indicate that the cell under test has to be printed as a dot of reduced size compared to the standard dot size.

The correction code in output from pattern recognition unit 4 is input, through leads 8, to the signal generator 5. The signal generator 5 is basically a static memory (programmable or not) which stores a plurality of binary codes. The signal generator 5, referenced or addressed by the correction code, outputs a selected one of said binary codes through a parallel input, serial output shift register 11 which serializes the binary code and produces a modification signal. This signal, through lead 9, is input to engine 2 and controls energization of the light beam source. Clearly, operation of temporary storage 3, pattern recognition unit 4 and signal generator 5 is controlled and timed, through leads 10, by the control unit 1.

Figure 2:
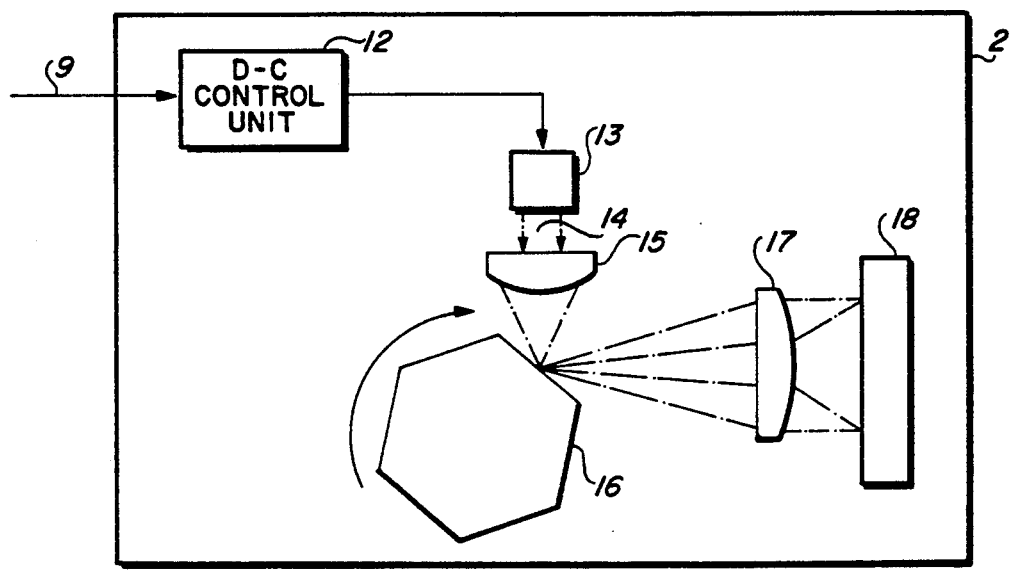
FIG. 2 shows the arrangement of a scanning light beam apparatus used in the electrophotographic apparatus of FIG. 1.

FIG. 2 shows, in more detail, some components of the engine or printing unit 2 of FIG. 1. The engine comprise a DC control circuit 12 which receives as an input the modification signal generated by signal generator 5 (FIG. 1). DC control circuit 12 switches on and off (or modulates in any suitable manner) the current which energizes a light beam source 13 (usually a laser diode). The light beam 14 emitted by the light source 13 is collimated, by suitable lenses 15, onto the surface of a rotating polygonal mirror 16 which deflects the light beam. Due to the rotation of the mirror, the light beam further collimated by a lens 17, sweeps a line 18 of a photosensitive surface which moves transversely to the scan direction of the light beam. The light beam has a finite size, and within the beam the light intensity has a gaussian distribution arranged in an elliptical shape, as shown by FIG. 3, where the inner ellipse indicates a portion of the beam having high intensity and the outer ellipses identifies areas of the beam having a decreasing intensity.

Figure 3:
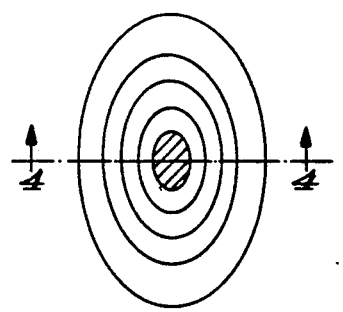
FIGS. 3 and 4 show the light intensity distribution in a light beam of the prior art according to a section view perpendicular to the beam axis and to a diametral section view.
Figure 4:
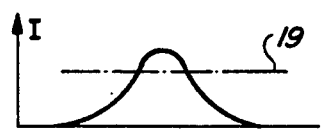
Figures 9A, 9B:
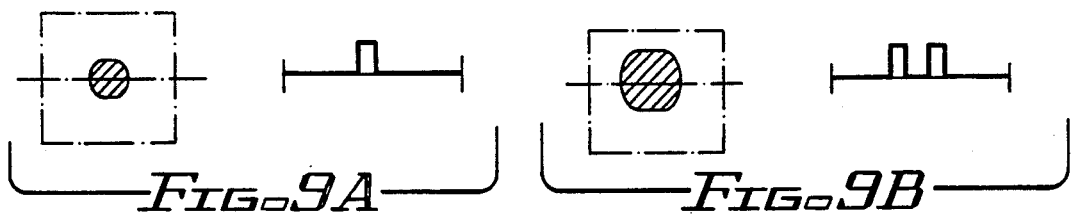
FIGS. 9A to 9G show examples (A to G) of dot images formed by modulating the light beam of FIGS. 6, 7, during the time required to scan a pixel and the related modulation pattern.
Figures 9C, 9D:
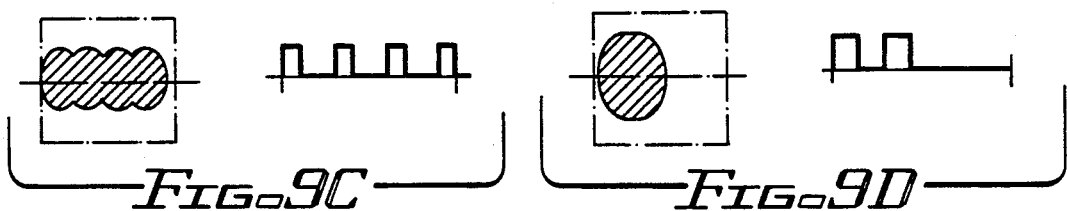
Figures 9E, 9F:
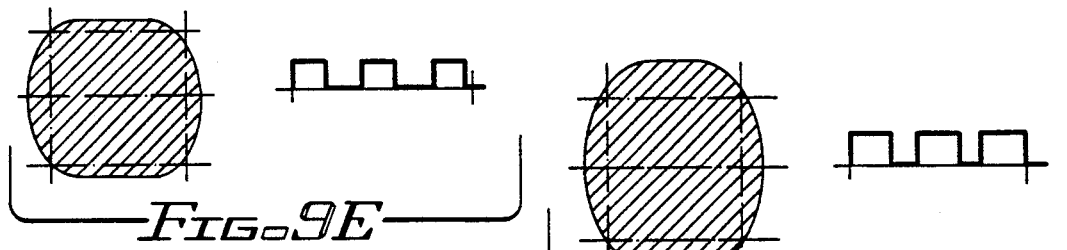
Figure 9G:
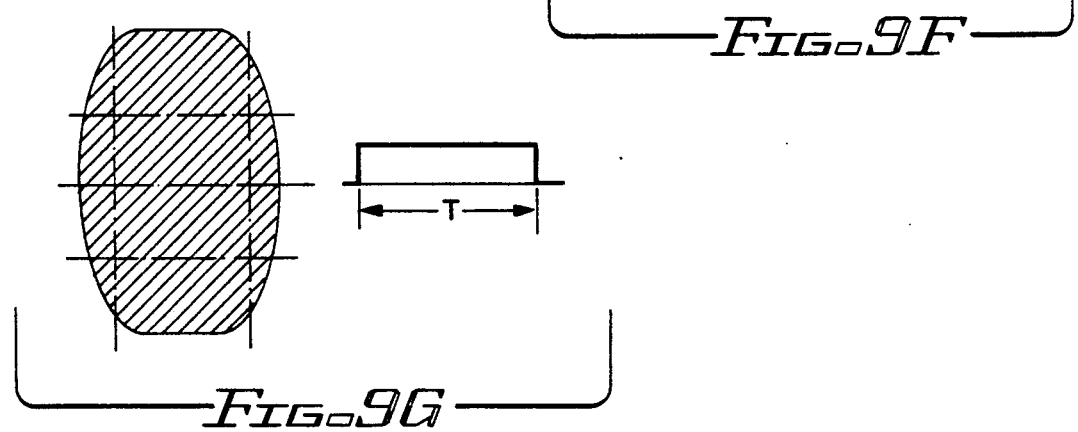

FIG. 4 shows the distribution of the light intensity in the beam according to a section A—A of FIG. 3. FIGS. 3 and 4 may also be considered as showing the energy radiated by unitary sections of the beam in a time unit. As known photosensitive materials respond to exposure (total number of photons impinging on the surface) and therefore to the locally received energy, exposure is the multiplicative product of intensity times the exposure time. Moreover the electrophotographic process may be considered as a binary threshold-dependent process, and imaging occurs only if the exposure reaches a predetermined threshold. By way of example, if the threshold of an electrophotographic process using a light beam whose intensity is shown by FIGS. 3, 4 is the one indicated by dotted line 19 in FIG. 4, the image resulting from a unitary time exposure, with a steady light beam impinging on the photosensitive surface, would be the one shown by the dashed area in FIG. 3.

Figure 5:
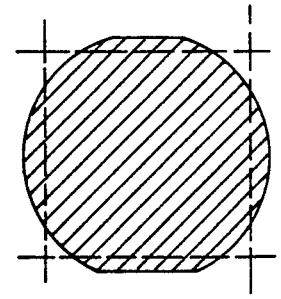
FIG. 5 shows the dot image formed by a light beam having the intensity distribution shown in FIGS. 3 and 4.

In practice, since the light beam line scans a succession of pixels with a scan period T for each pixel, the resulting image for energization of the light source during the whole period T is the one shown in FIG. 5 as it results from the time integral of the variable light intensity received at each infinitesimal point of the photosensitive surface during the whole time interval T. The resulting image has approximately the nominal size of the individual pixel (shown by the dotted line square). If the light beam source is continuously energized for a period greater than T, for example, a multiple of T, a continuous solid line is obtained whose amplitude in the direction transverse the scan direction, is still the same, say substantially equal to the scan pitch and not exceeding it by more than 10-20%.

By modulating the light beam during scan within each scan period T, the local exposure can be reduced, and the resulting image consists of a plurality of smaller dots, somewhat overlapped in the scan direction. Differently from this approach and in accordance with the invention, a light beam source and related optical means (in the whole constituting what may be designated as printing means) are designed so as to provide a higher light intensity and a somewhat larger size of the beam. For purpose of comparison with FIGS. 3 and 4, FIGS. 6 and 7 show the light intensity distribution of such a beam in a section perpendicular to the beam axis (FIG. 6) and in adiametral section of the light beam cylinder (FIG. 7).

Figure 8:
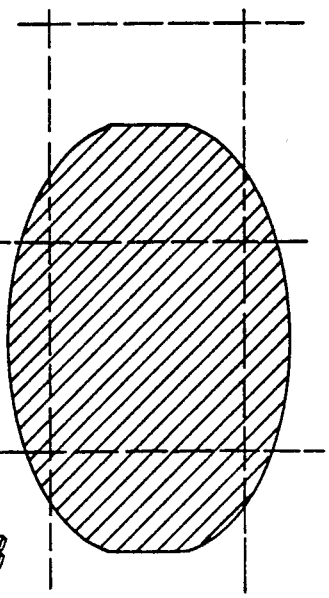
FIG. 8 shows the dot image formed by an unmodulated light beam having the intensity distribution shown in FIGS. 6 and 7.

If the source of this light beam is continuously energized during the whole time interval T required to scan an individual pixel, the resulting image is enlarged both in the scan direction as well as in the direction transverse thereto, achieving an amplitude which is much more than 120% of the scan pitch and preferably twice (or even more) the scan pitch as shown in FIG. 8 in which the nominal size of the pixel, hence the scan pitch, is the one identified by the dotted line grating. If the light beam source is continuously energized for a period greater that T, it may even occur that the obtained continuous solid line has an amplitude or thickness more than two times greater than the scan pitch, a matter which has to be taken into account in driving the light beam source, as it will be described later on.

Conversely, even if the light beam does not produce a dot image having an amplitude twice the scan pitch when the light source is continuously energized in the period T, but only a somewhat enlarged dot image, it is possible that this result can be achieved for a continued energization during a period T1 somewhat greater than T. This occurrence can be suitably exploited as will be described later on.

Figure 6:
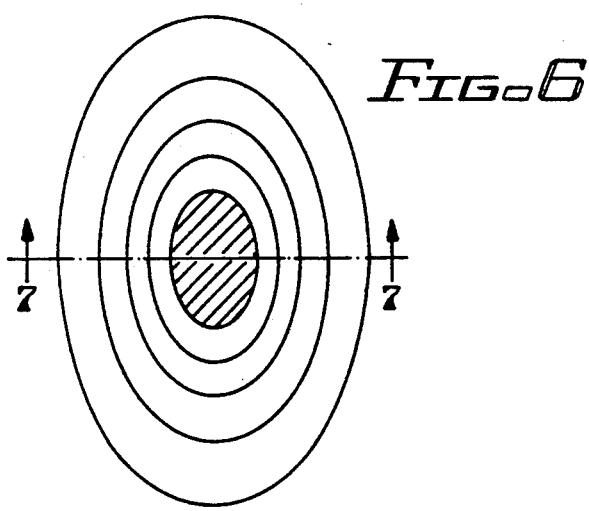
FIGS. 6 and 7 show the light intensity distribution in a light beam, used in the apparatus of the invention, according to a section view perpendicular to the beam axis and to a diametral section view.
Figure 7:
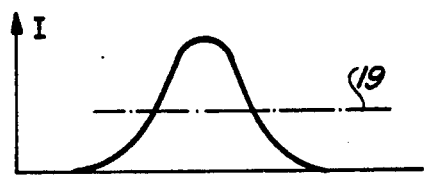

If a light beam such as the one shown in FIGS. 6, 7, 8 is used, dots having a standard size equal to the pixel size can be obtained by modulating the light beam, thus energizing it with a predetermined duty cycle. By reducing the duty cycle, dots smaller than the pixel size can be obtained or even short lines or ovals within the pixel and composed of small size dots, the lines (ovals) having a thickness (amplitude) in the direction transverse the scan direction less than the scan pitch. By increasing the duty cycle, enlarged dots, greater than the pixel size, at least in the direction transverse the scan direction, can be easily obtained.

For exemplary purposes, FIG. 9 shows samples (A to G) of dot images which can be obtained and, on the right side of each dot image, the modulation signal within time period T, used to produce such image. Clearly, the dot images are always centered on the scan line and cannot be offset transversely to the scan line direction.

Figure 10:
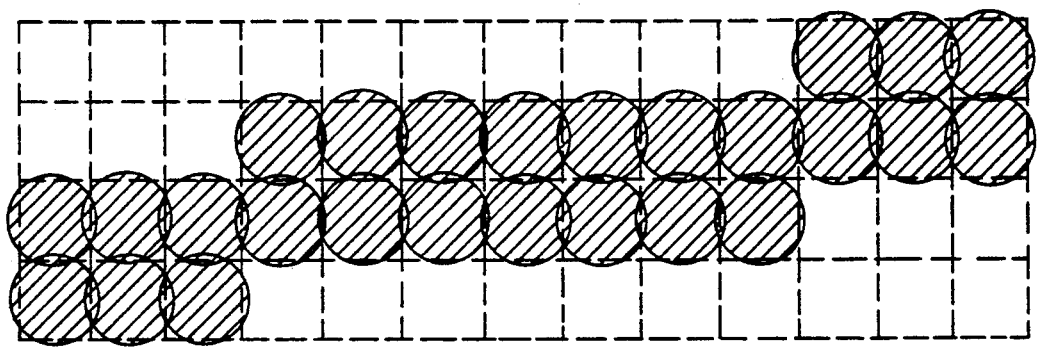
FIG. 10 shows the image of a line slightly slanted as to the scan direction obtained in prior art apparatus without enhancement capability.
Figure 11:
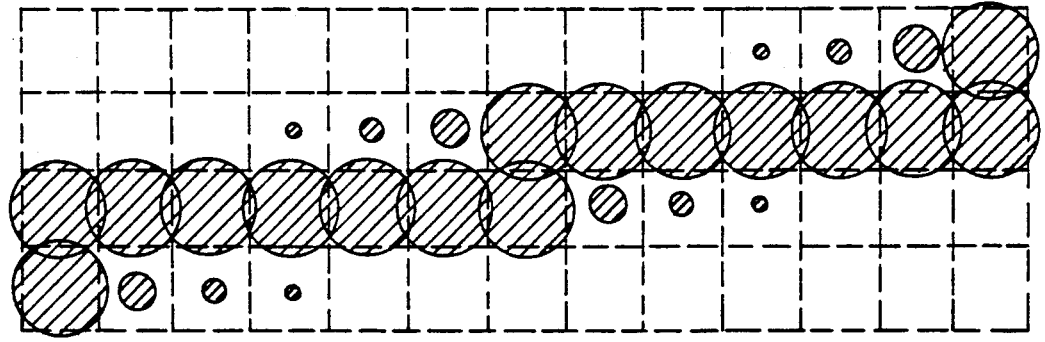
FIG. 11 shows the image of a line slightly slanted as to the scan direction obtained in prior art apparatus with enhancement capability.
Figure 12:
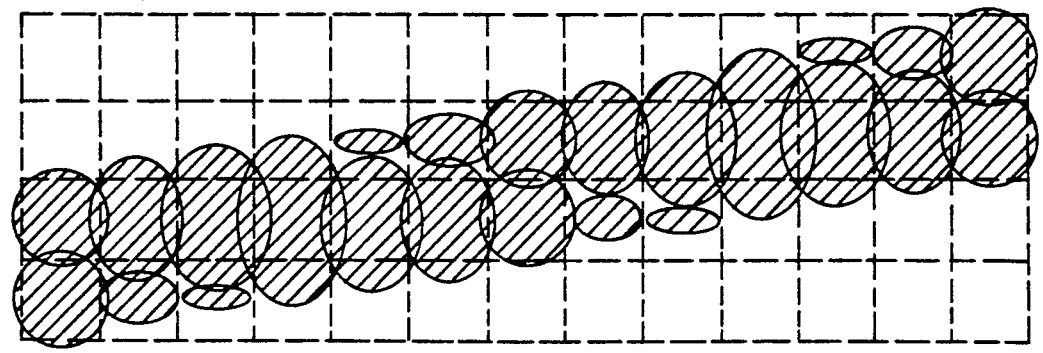
FIG. 12 shows the image of a line slightly slanted as to the scan direction obtained in the apparatus of the invention.

FIGS. 10, 11, 12 provide visual evidence of the enhancement resulting from application of the invention. In FIG. 10, a nearly horizontal line obtained by printing a succession of dots having a size substantially equal to the pixel is shown, as it occurs in conventional electrophotographic apparatuses where no enhancement is used. The stair step effect of the resulting image is clearly detectable. In FIG. 11, a nearly horizontal line obtained by printing a succession of dots having a size equal to or lesser than the pixel is shown, as it occurs in conventional electrophotographic apparatuses using the enhancement arrangements of the prior art. The stair step effect of the resulting image is somewhat masked, but can still be perceived as undulation and solidity lack of the edges. In FIG. 12, a nearly horizontal line obtained by printing a succession of dots having a size equal, lesser or greater than the pixel size is shown as it results in the electrophotographic apparatus of the present invention. Solidity of the image is remarkably enhanced, and the stair step effect is nearly completely eliminated. It is clear that similar advantages can be obtained in printing images having different configurations, such as corners, serifs, line crossing and so on.

It has been previously indicated that when forming enlarged dot images adjacent in the scan direction, the resulting dot size in a pixel may be affected by the presence of a dot in the next following pixel. Reciprocally, the dot size in the next following pixel may be affected by the presence of a dot in the preceding pixel. This reciprocal influence, on the occurrence, can be eliminated by the improvement provided in the modified pattern recognition unit shown in FIG. 13.

Figure 13:
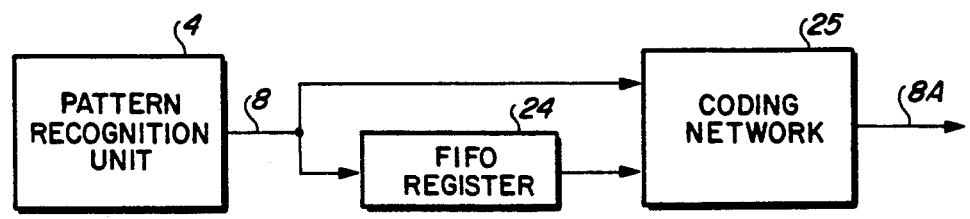
FIG. 13 shows a modification of a pattern recognition unit used in the apparatus of the invention.

The modified pattern recognition unit of FIG. 13 comprises the pattern recognition unit 4 already described with reference to FIG. 1 and further comprises a FIFO register 24 of two cascaded stages and a coding network 25. For each cell under test, the pattern recognition unit 4 outputs a correction code indicating which kind of correction is required. This code is input to both the coding network 25 and the register 24. The output of register 24 is input to coding network 25. Loading of register 24 and information inputting to coding network 25 are suitably timed so that coding network 25 receives, at the same time, the correction code related to a cell under test from output 8 and the correction code related to the previous cell under test from the register 24. The coding network in turn generates an actual correction code on output 8A for selection of the appropriate modification signal, taking into account the interference among adjacent dot images tending to increase the resulting dot size.

Conversely, if the continued energization of the light beam source for the period T required to scan a pixel does not suffice to produce a dot having the desired amplitude, the same network can be used to provide an actual correction code which takes into account the need for extending the light source energization period related to a cell to overlap the next following period.

In the preceding description, the signal generator, which generates the modification signal used to control the light beam source, has been particularly identified as a generator of a binary code which, serialized, controls the switching on/off of the light beam source. An equivalent result may be obtained by energizing the light source with a power having a level or an amplitude modulation selectable among a plurality of amplitudes or amplitude modulations. In this case, the signal generator may take the form of an electronic circuit, controlled by the correction code, which energizes the light beam source with a predetermined power level or amplitude modulation selected from among the plurality in dependence of the correction code.

What is claimed is:

1. Electrophotographic printing apparatus with enhanced printed image capability comprising:
    character generator means providing a bit data signal representative of a bit mapped image of a desired image;
    image forming means performing parallel scanning operations of an image support in a predetermined direction and with a predetermined pitch between said scanning operations, said image forming means being responsive to a modification signal input to said image forming means to form said desired image on said image support by dots, each dot being representative of a bit in said mapped image, each dot having an amplitude transverse said predetermined scanning direction which, depending on said modification signal, spans from an amplitude which is less than said predetermined pitch to an amplitude which is more than 120% of said predetermined pitch;
    temporary storage means coupled to said character generator means temporarily storing portions of said bit data signal representing N number of consecutive bits in M number of consecutive lines of said bit mapped image forming an M×N subset of the bits defining said bit mapped image, a number of said bits forming a sample window having a central bit and adjacent bits;
    pattern recognition means coupled to said temporary storage means for recognizing the bit pattern formed by said central bit and the remaining adjacent bits in said simple window and providing a binary code related to said recognized pattern indicating that said central bit in said recognized pattern has to be represented as a dot formed on said image support having a predetermined one of a plurality of dot features related to said recognized pattern, said plurality of dot features comprising:
        a standard dot having a standard amplitude transverse said predetermined scanning direction substantially equal to said predetermined pitch;
        an enlarged dot having an amplitude transverse said predetermined scanning direction more than 120% greater than said standard amplitude;
        a smaller dot size having an amplitude transverse said predetermined scanning direction lesser than said standard amplitude;
    signal generating means coupled to said pattern recognition means and responsive to said binary code for generating a related one of a plurality of modification signals, each of said modification signals being related to one of said dot features; and
    said image forming means being coupled to said signal generating means and responsive to said modification signals to form dots having the feature related to each of said modification signals.

2. Electrophotographic apparatus as in claim 1 comprising means coupled to said pattern recognition means and responsive to a plurality of subsequent binary codes output from said pattern recognition means for generating a modified binary code, said modified binary code being input to said signal generating means.

3. Electrophotographic apparatus as in claim 1 where said image forming means is responsive to one of said modification signals to form, on said image support, dots having an amplitude transverse said scanning direction no less than twice said predetermined pitch.

* * * * *